2,966,498
PREPARATION OF CITRACONIC ANHYDRIDE

Marshall F. Humphrey, Fanwood, N.J., assignor to Chas. Pfizer & Co., Inc., Brooklyn, N.Y., a corporation of Delaware No Drawing. Filed Apr. 23, 1958, Ser. No. 730,258

5 Claims. (Cl. 260—346.8)

This application is concerned with a new and useful process for the production of citraconic anhydride.

Anhydrides are useful compounds for curing epoxy resins. Their use is fully described by Schildknecht in Polymer Processes, Interscience Publishing Co., New York, 1956, pages 444–447. Epoxy resins are a relatively new class of polymers which have found extensive use in various polymer applications as coatings, adhesives and as molded products. They are particularly useful in capsulating delicate electronic circuits to insulate and strengthen them.

Epoxy resins have chemical and physical properties which make them extremely desirable in these applications. They can be prepared in various physical forms ranging from viscous syrups to extremely hard solids. They have excellent adhesive strength and have relatively low shrinkage during the curing operation.

Curing is a well known process which is applied to resinous materials to enhance their hardness and heat resistance. Anhydrides, specifically, are used in the curing of epoxy resins to form cross-linked three dimensional polymers of increased hardness. In this process the anhydride is contacted with the resin and a catalytic amount of a tertiary amine, for example, benzyl-dimethylamine at a temperature of from about 25° C. to 120° C. until a hard glassy polymer results. Citraconic anhydride, when used in this process, is known to produce useful products.

Heretofore, citraconic anhydride has been prepared by maintaining itaconic acid at an elevated temperature so as to eliminate a molecule of water and to form the desired product which is isolated by rapid distillation at atmospheric pressure. This method has been found successful with only certain samples of refined, i.e. highly purified, itaconic acid, while with other apparently identical samples of refined itaconic acid, a mildly exothermic side reaction is observed to occur accompanied by extensive tar formation and serious reduction in yield.

It will be appreciated that problems of this nature are of a special concern in industrial production where financial consideration requires that a high yield be obtained, or that at least the yield must be reproducible in order to operate a process profitably.

It has been surprisingly found that citraconic anhydride may be produced in high reproducible yield by the pyrolysis of itaconic acid in the presence of certain alkali metal salts. The process of the instant invention, makes it possible to produce citraconic anhydride in high, reproducible yield using either refined or technical grade of itaconic acid, and is, therefore, a useful advance in the arts.

The process of the instant invention is accomplished by heating itaconic acid in the presence of an alkali metal sulfate or an alkali metal phosphate. The mixture of itaconic acid and alkali metal salt is heated at a temperature sufficient to liquefy itaconic acid. Generally, a temperature of from about 165° to about 190° C. may be employed although the preferred temperature is from about 165° to about 175° C. since best yields are realized in this range. Temperatures higher than 190° C. may be employed but may lead to reduced yield of product. Product formation is almost instantaneously as evidenced by the evolution of water from the reaction mixture. Heating of the mixture is continued until the theoretical amount of water is evolved from the reaction mixture.

The time required for the reaction will be determined by the amount of acid to be dehydrated and the temperature employed. When employing the above described temperature range, water is generally evolved at a rate of from about 0.4 to about 1.2 ml. per minute per mole of acid. The rate of reaction is conveniently followed by observing the amount of water evolved as heating progresses. It is usually preferred, but not essential, to first liquefy the itaconic acid and then add catalyst.

As mentioned above, the water formed by dehydration distills from the mixture as the reaction proceeds. This is particularly advantageous since it obviates the necessity of separating liquid water from the product, i.e. citraconic anhydride, which is found to be particularly water-sensitive, hydrolyzing to the acid almost on contact with water.

After the reaction is complete the product is obtained by standard procedures. For example, distillation at reduced pressure is found to yield a highly pure product. Alternatively, where purity of the product is not of major importance, the reaction mixture may be filtered to separate the alkali metal salt and obtain crude citraconic anhydride. It is generally preferred to distill the product at low pressure, for example, pressures below 100 mm. of mercury, where the anhydride distills at moderate temperature. It is preferred to avoid the use of excessively high temperature since the product is found to be somewhat heat sensitive. Alternatively, the product, i.e. citraconic anhydride, may be obtained as it is formed in the reaction mixture by the use of reduced pressure during heating. The anhydride, being volatile, distills from the reaction mixture along with water that is formed. However, this procedure is not preferred since it necessitates the separation of the product from the codistilled water which may hydrolyze product and lead to reduced yields.

As mentioned above, the alkali metal salts employed as catalysts in the present process are alkali metal sulfates and alkali metal phosphates, particularly, alkali metal dihydrogen phosphate of the formula $MH_2PO_4$ in which M is the alkali metal. By alkali metal, of course, is meant sodium, potassium, or lithium. The amount of catalyst to be employed may range from about 0.4% to about 6.0% based on the weight of itaconic acid. Larger amounts of alkali metal salts may be used but no advantage is realized in so doing.

As mentioned above, a major advantage of the present process lies in the high reproducible yields of citraconic anhydride. Additional advantages are realized in employing the present process; principal among these are the temperature and time of reaction. As mentioned above, when itaconic acid is heated to form citraconic anhydride only very highly refined grades of the acid are successfully converted to the anhydride. Even with such highly refined grades of itaconic acid a variable yield may be obtained. Considerable variance is noted in the temperature required for the dehydration reaction. Certain samples dehydrate at moderate temperature, others only at considerably elevated temperatures, for example, temperatures well above 200° C.

The employment of alkali metal salts as described in the present process considerably reduce the temperature required for the dehydration reaction as well as the time of the reaction. As mentioned above, the course of the reaction may be followed by measuring the rate of evolution of water from the reaction mixture. When refined itaconic acid is dehydrated, the rate of the reaction is quite slow, for example, water is evolved at a rate of from about 0.1 ml. to about 0.25 ml. per minute per mole of acid. In the presence of the alkali metal salts as described above, the rate of evolution of water is remarkably increased, thus reducing the total time required for the process. Such reductions of time are obviously highly desirable particularly in large scale industrial production where considerable saving is realized. Further, the employment of alkali metal salts in the present process reduces the temperature requirement. The reaction proceeds favorably at reduced temperature considerably below that generally required when no alkali metal salt is present. This advantage, to be sure, is highly desirable in large scale industrial processes where high temperatures are required. The above described advantages of the present process makes it highly desirable for the large scale commercial production of citraconic anhydride.

Itaconic acid is a known compound which may be prepared by various procedures, for example, by microbiological fermentation as described by Kane et al. in U.S. Patent 2,385,283.

As mentioned above, either highly purified refined itaconic acid or technical grade of itaconic acid may be utilized in the present process. Highly purified, refined itaconic acid can be characterized by its melting point (167–168° C.), its neutralization equivalent (65) or its bromine number (160). These latter two figures are the theoretical values and many refined products will have values varying slightly from these. Technical grade itaconic acid is generally lower melting, and melts over a range of temperature. Its neutralization equivalent and bromine number may vary quite considerably from those given above.

The following examples are given by way of illustration and are not to be construed as limitations of this invention many variations of which are possible within the scope and spirit thereof.

Example I

To 200 g. of refined itaconic acid was added 10 g. of $KH_2PO_4$. The mixture was heated in a still pot at 170° C. until 28 ml. of water was obtained. Water distilled from the reaction mixture at an average rate of 0.93 ml. per minute. The reaction mixture was then distilled at reduced pressure to obtain a 75% yield of pure citraconic anhydride.

Example II

To 200 g. of refined itaconic acid was added 2 g. of sodium sulfate and the mixture heated in a still pot at 165° C. at atmospheric pressure until 28 ml. of water distilled from the mixture. The water distilled at an average rate of 0.45 ml. per minute.

The product was obtained by vacuum distillation of the reaction residue in 81% yield.

Example III

The procedure of Example II was repeated employing 4 g. in place of 2 g. of sodium sulfate at 175° C. An 87.2% yield of citraconic anhydride was obtained.

Example IV

The procedure of Example I was repeated employing 2 g. in place of 10 g. of $KH_2PO_4$. Water evolved at an average rate of 0.63 ml. per minute at a temperature of 170° C. A 72% yield of citraconic anhydride was obtained.

Example V

The procedure of Example II was repeated employing 3 g. of sodium sulfate at a temperature of 173° C. An 89% yield of citraconic anhydride was obtained.

Example VI

Two hundred grams of crude itaconic acid was heated with 12 g. of sodium sulfate at atmospheric pressure at 175° C. Water was evolved at an average rate of 3.1 ml. per minute and a yield of 78% of citraconic anhydride obtained.

Example VII

Two hundred grams of refined itaconic acid was heated at atmospheric pressure at 180° C. Water was evolved at an average rate of 0.12 ml. per minute per mole. A 50% yield of citraconic anhydride was obtained.

This procedure was repeated with other samples of itaconic acid to give varying yields, for example, 69%, 31%, 76%, at respective temperatures of 234°, 247° and 194° C.

Example VIII

The procedure of Example II was repeated employing sodium and lithium dihydrogen phosphate with comparable results.

Example IX

The procedure of Example II was repeated employing lithium and potassium sulfate with comparable results.

What is claimed is:

1. A process for the production of citraconic anhydride which comprises heating itaconic acid in the presence of from about 0.4% to about 6% by weight based on said itaconic acid of a salt selected from the group consisting of alkali metal dihydrogen phosphate and alkali metal sulfate, at a temperature of from about 165° to 190° C.

2. A process as claimed in claim 1 wherein the temperature employed is from about 165° to about 175° C.

3. The process as in claim 1 wherein the alkali metal sulfate is sodium sulfate.

4. The process as in claim 1 wherein the alkali metal phosphate is potassium dihydrogen phosphate.

5. The process as in claim 1 wherein the alkali metal sulfate is potassium sulfate.

References Cited in the file of this patent

UNITED STATES PATENTS

| | | |
|---|---|---|
| 2,088,347 | Schening et al. | July 27, 1937 |
| 2,134,531 | Punnett | Oct. 25, 1938 |
| 2,509,873 | McAteer | May 30, 1950 |

OTHER REFERENCES

Barb: J. Chem. Soc., London, 1955, pp. 1647–1651.